(12) United States Patent
Mao

(10) Patent No.: US 9,894,045 B1
(45) Date of Patent: Feb. 13, 2018

(54) DETERMINING APPLICATION REPUTATION BASED ON DEVIATIONS IN SECURITY RATING SCORES

(71) Applicant: Symantec Corporation, Mountain View, CA (US)

(72) Inventor: Jun Mao, Torrance, CA (US)

(73) Assignee: SYMANTEC CORPORATION, Mountain View, CA (US)

(\*) Notice: Subject to any disclaimer, the term of this patent is extended or adjusted under 35 U.S.C. 154(b) by 81 days.

(21) Appl. No.: 14/968,453

(22) Filed: Dec. 14, 2015

(51) Int. Cl.
*H04L 29/06* (2006.01)

(52) U.S. Cl.
CPC .......... *H04L 63/061* (2013.01); *H04L 63/126* (2013.01); *H04L 63/1408* (2013.01)

(58) Field of Classification Search
CPC ....... H04L 63/12; H04L 63/20; H04L 63/145; H04L 63/061; H04L 63/126; H04L 63/1408; H04L 63/1433; H04L 63/123; H04L 63/1416
USPC .............................. 726/22–26; 713/171, 188
See application file for complete search history.

(56) References Cited

U.S. PATENT DOCUMENTS

| | | | | |
|---|---|---|---|---|
| 7,373,524 | B2* | 5/2008 | Motsinger | H04L 63/0876 713/188 |
| 7,900,259 | B2* | 3/2011 | Jeschke | H04L 63/1433 713/164 |
| 8,621,591 | B2* | 12/2013 | Sobel | G06F 21/645 713/156 |
| 8,856,936 | B2* | 10/2014 | Datta Ray | H04L 63/1433 726/25 |
| 9,009,819 | B1* | 4/2015 | Savant | G06F 21/57 726/22 |
| 9,021,589 | B2* | 4/2015 | Anderson | G06F 21/56 709/206 |

\* cited by examiner

*Primary Examiner* — Hosuk Song
(74) *Attorney, Agent, or Firm* — Patterson + Sheridan LLP

(57) ABSTRACT

The present disclosure relates to detecting security risks from application packages signed using a key based on differences detected between application packages. An example method generally includes calculating a difference score for a first application package signed using the key. The difference score may be based on differences detected between content of the first application package and content of one or more second application packages signed using the key. A computing system calculates an average difference score from the individual difference scores. Upon determining that the difference score for a specific application package of the second application packages exceeds the average difference score by a threshold amount, the computing system sets a reputation associated with the specific application package to an unknown reputation and generates an alert indicating that the specific application package is a potential security risk.

20 Claims, 5 Drawing Sheets

DETERMINING APPLICATION REPUTATION BASED ON DEVIATIONS IN SECURITY RATING SCORES

BACKGROUND

Field

Embodiments presented herein generally relate to computer security systems, and more specifically, to determining application reputation based on differences in security rating scores between applications.

Description of the Related Art

Users often download applications from a centralized application repository, such as the Mac App Store, the iTunes App Store or Google Play. Applications downloaded from such repositories are generally signed using a key owned by an application developer. Generally, an application developer owns a single key used to sign all applications published on the application repository. The key may be, for example, the private key from a public-private key pair. The private key is generally maintained by the application developer as a secret, and the corresponding public key is generally used to verify a signature associated with an object generated using that object and the private key. By verifying the signature used to sign an application, a system can identify the source of the application.

Applications created by the same company (i.e., signed using a common key) generally express a number of similarities. For example, applications distributed by the same company may use the same application program interfaces (APIs), common graphical user interface (GUI) elements, and so on. Additionally, applications from the same developer may use a common package naming convention. However, in some cases, a legitimate application created by the developer may use significantly different APIs, GUI elements, and so on from other applications created by the developer. In some cases, security systems may flag these applications as potential security risks even though these applications are legitimate.

In some cases, a key leak may occur, which may expose an application developer's private key to the public. When a key leak occurs, malware developers can sign rogue applications using the leaked key, thus making it appear that a rogue application was released by a legitimate application developer. Until the leaked key is revoked (or more specifically, a certificate identifying the public key and the developer is revoked), malware developers may release applications that appear to be legitimate.

Security software can be configured to block installation and execution of applications based on a variety of parameters. For example, rule-based security policies can be used to rate the security risks posed by different applications. Security software may apply rules based on the priority associated with each rule. Miscalculating the priority associated with each rule may cause errors by either blocking applications that are safe or allowing unsafe applications to execute on the computer system.

SUMMARY

One embodiment of the present disclosure includes a method for detecting security risks from application packages signed using a key. The method generally includes calculating a difference score for a first application package signed using the key. The difference score may be based on differences detected between content of the first application package and content of one or more second application packages signed using the key. A computing system calculates an average difference score from the individual difference scores. Upon determining that the difference score for a specific application package of the second application packages exceeds the average difference score by a threshold amount, the computing system sets a reputation associated with the specific application package to an unknown reputation and generates an alert indicating that the specific application package is a potential security risk.

Another embodiment provides a computer-readable storage medium having instructions, which, when executed on a processor, performs an operation for detecting security risks from application packages signed using a key. The method generally includes calculating a difference score for a first application package signed using the key. The difference score may be based on differences detected between content of the first application package and content of one or more second application packages signed using the key. A computing system calculates an average difference score from the individual difference scores. Upon determining that the difference score for a specific application package of the second application packages exceeds the average difference score by a threshold amount, the computing system sets a reputation associated with the specific application package to an unknown reputation and generates an alert indicating that the specific application package is a potential security risk.

Still another embodiment of the present invention includes a processor and a memory storing a program, which, when executed on the processor, performs an operation for detecting security risks from application packages signed using a key. The method generally includes calculating a difference score for a first application package signed using the key. The difference score may be based on differences detected between content of the first application package and content of one or more second application packages signed using the key. A computing system calculates an average difference score from the individual difference scores. Upon determining that the difference score for a specific application package of the second application packages exceeds the average difference score by a threshold amount, the computing system sets a reputation associated with the specific application package to an unknown reputation and generates an alert indicating that the specific application package is a potential security risk.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein provide techniques for detecting potential security risks from applications signed using a common signing key. Potential security risks can be detected, for example, based on differences between applications signed using the same key. A security system can flag the potential security risks for resolution. In some cases, a user may resolve potential security risks on an endpoint system. In some cases, a manager of a reputation service may resolve potential security risks on the reputation service, which allows security software on an endpoint system to allow or block users from downloading and/or executing known malware or otherwise rogue applications on the endpoint system. When a user identifies a flagged application as legitimate (a false positive) or as a security threat, endpoint systems may allow the false positive applications to execute and block the applications flagged as security threats from executing on the endpoint system.

Advantageously, by analyzing applications signed using a common key for significant deviations from other applications signed by the same key, a security system can determine which applications may pose a security risk to an endpoint system (e.g., rogue data exfiltrators, keyloggers, premium short messaging service (SMS) attacks, and so on). User resolution of the flagged security threats may additionally indicate if an application developer's private key has been leaked and used to sign rogue applications, which may be used to block users from installing and/or executing any new applications signed using the leaked key.

Figure 1:
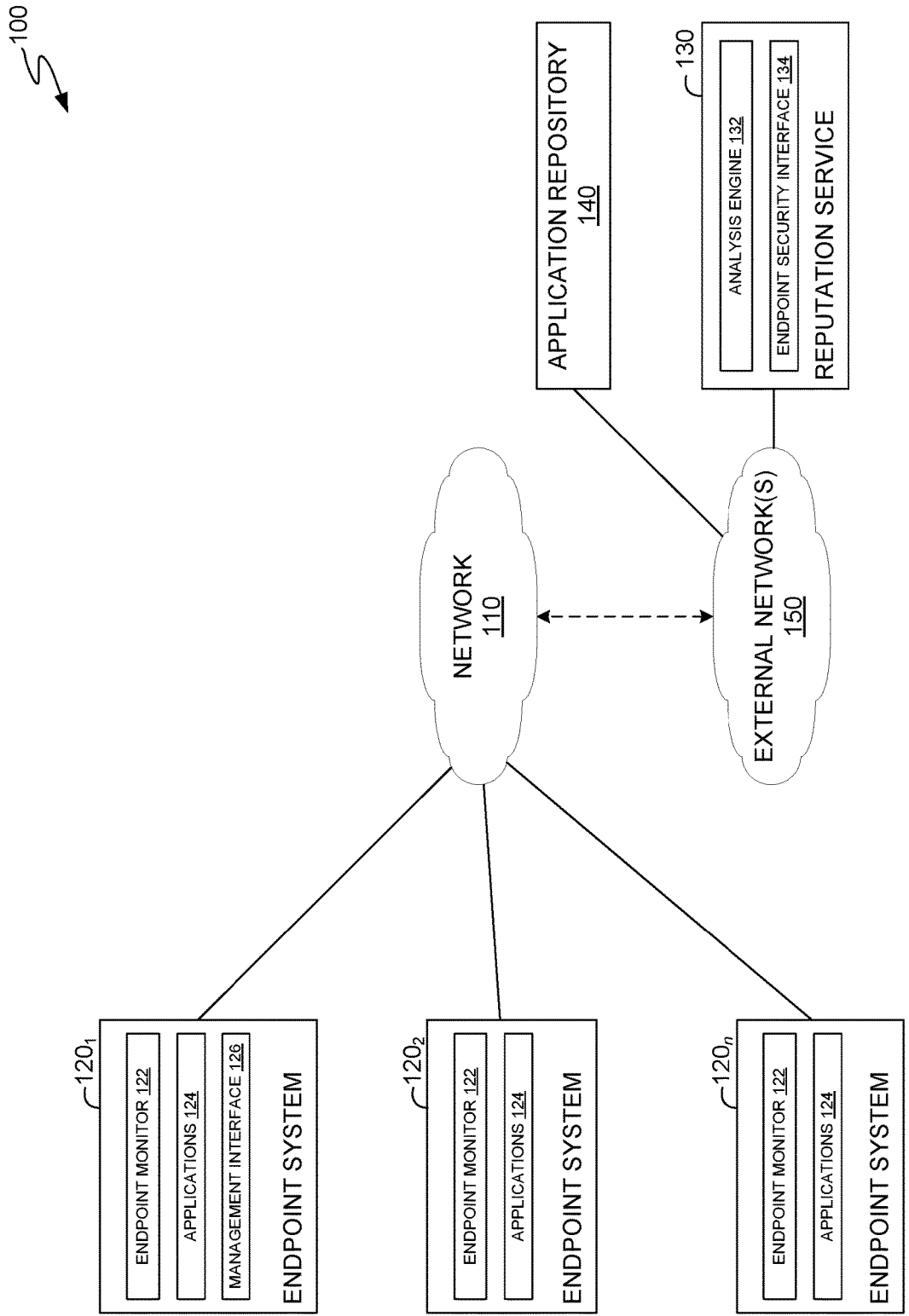
FIG. 1 illustrates an example of a networked computing environment, according to one embodiment.

FIG. 1 illustrates an example computing environment 100, according to one embodiment. As shown, the computing environment includes a plurality of endpoint systems 120 connected to a network 110. Network 110 may be connected to one or more external networks 150, and each of the endpoint systems 120 may access a remote reputation service 130 and an application repository 140 through network 110 via one or more external networks 150.

Each endpoint system 120 in network 110 may execute an endpoint security system locally to monitor for potential security breach events, such as rogue downloads, execution of rogue applications, exfiltration of data stored endpoint system 120, and so on. As illustrated, endpoint systems 120 generally include an endpoint monitor 122 and one or more applications 124.

In some cases, endpoint monitor 122 includes an interface for querying a reputation service 130 for information about an application 124 that attempts to execute on endpoint system 120 or that a user is downloading onto endpoint system 120. Endpoint monitor 122 may begin running when endpoint system 120 is booted up.

When a user attempts to download an application package from an application repository 140, endpoint monitor 122 queries reputation service 130 to obtain reputation information for the downloaded application. If the reputation service indicates that the downloaded package has a good reputation (e.g., widely used and trusted open source software packages, such as the GIMP image manipulation program, the OpenOffice productivity suite, or mobile ports of desktop open source packages) or is trusted (e.g., commercially available software signed by the software provider), endpoint monitor 122 may allow installation of the program from the downloaded application package. If, however, the reputation service indicates that the downloaded application package is untrusted (e.g., the application includes malware, keyloggers, or other security threats), endpoint monitor 122 may block installation of the program and may additionally delete the downloaded program installation package.

In some cases, endpoint system 120 may further include an application analysis engine in addition to or in lieu of an interface to query reputation service 130. The analysis engine may obtain one or more applications signed using a particular developer key from an application repository and compare each of the applications obtained from the application repository to a target application obtained from the application repository. In some cases, the target application may be a known, trusted application; in other cases, the target application may be an application previously determined to be representative of the applications distributed by the developer through the application repository.

For each application obtained from the application repository, the analysis engine can calculate a score indicating the application's similarity to the target application. In one case, a difference score can be calculated based on similarities between the application and the target application in package naming scheme, APIs and GUI elements that are used in the applications, and so on. As discussed above, applications created by the same developer typically use a common naming scheme, many of the same APIs, and many of the same GUI elements. Thus, with some exceptions, the difference score between a target application and an application obtained from the application repository may typically be low (e.g., close to zero).

In some cases, the analysis engine can calculate other scores for determining whether an application is a potential security risk. For example, the analysis engine can generate a score based on application classifications, where the analysis engine examines the functionality of the application and classifies the application as a multimedia application, a messaging application, a gaming application, and so on. Because applications developed by the same developer generally fall within the same category, applications in a different class than the bulk of the applications signed using a developer's private key may be flagged as a potential security risk.

In yet another case, the analysis engine can determine whether an application is a potential security risk using rules-based scoring. Rules-based scoring may be used, for example, to generate a difference score between a target application and an application obtained from the application repository by examining which security rules are triggered by the applications. For example, similar applications may trigger data transmission rules using a common destination. However, a rogue application signed using a developer's private key may trigger data transmission rules using a different destination or different data format, and an analysis engine can use such deviations in rules-based scoring to detect differences between applications available for download from an application repository.

Upon calculating deviation scores for each of the one or more applications, the analysis engine calculates the average deviation score for the applications signed using a particular key. Based on the calculated average deviation score, the analysis engine calculates the difference between the average deviation score and the deviation scores for each of the one or more applications. If the difference exceeds a threshold value, the analysis engine can flag the application as a potential security risk and flag the application for further review. Otherwise, the analysis engine can flag the application as safe and allow a user to download and execute the application on endpoint system 120. In some cases, the threshold value may be a number of standard deviations away from the calculated average mean deviation score for all of the applications signed using the same key.

In some cases, endpoint system 120 may include a management interface 126. Management interface 126 allows a user of the endpoint system 120 to view applications flagged as potential security risks (either from a local analysis engine or from an analysis engine at a remote reputation service 130) and resolve the flagged applications as legitimate applications (i.e., false positives) or rogue applications. If a user resolves a flagged application as a false positive through management interface 126, the flagged application may be resolved as a legitimate application in endpoint monitor 122 or reputation service 130 (e.g., added to a whitelist). Otherwise, if a user resolves a flagged application as a security risk, the application may be marked as untrusted at endpoint system 120 or reputation service 130 (e.g., added to a blacklist).

Additionally, when a user resolves a flagged application as a security risk, the resolution may additionally indicate that the key used to sign the flagged application has been leaked. In some cases, the key itself may be added to a blacklist at endpoint monitor 122 or reputation service 130. When new applications signed using the leaked key are added to application repository 140, the new applications may be automatically added to a list of untrusted applications (an application blacklist) at endpoint monitor 122 or reputation service 130. By adding applications signed using a leaked key to a blacklist automatically, endpoint monitor 120 may proactively prevent users from downloading or executing newly released applications signed using a leaked key, as such applications have a high probability of being malicious.

If the application is resolved in a local endpoint monitor 122, the resolution may be effective only for the endpoint system 120 on which the local endpoint monitor 122 executes. If the application is resolved on a reputation service 130 through management interface 126, however, the resolution may be effective for any endpoint system 120 that queries reputation service 130 for reputation data before allowing (or not allowing) a user to download and/or execute the application.

Reputation service 130 generally may be an existing service that uses crowdsourced data to determine whether applications are trusted, untrusted, or unknown. In some cases, reputation service 130 may be hosted in the cloud and accessible by endpoint monitor 122 via an external network 140 (e.g., the Internet). As new applications and threats are introduced into various computing environments, reputation service 130 may be updated to reflect the reputation of the new applications. For example, when a new version of an office productivity suite is released, reputation service 130 may be updated to reflect that the new version of the office productivity suite is trusted (like previous versions of the suite). Other applications may initially have an unproven or unknown reputation, and as reputation service 130 receives additional data about the application from other users, reputation service 130 may update the reputation to reflect user feedback about the application. In some cases, reputation data about known threats (e.g., rogue keyloggers, botnet software, etc.) may be stored in reputation service 130 with an untrusted reputation to prevent such applications from executing on endpoint systems.

As illustrated, reputation service 130 may include an analysis engine 132 and an endpoint security interface 134. As discussed above, analysis engine 132 may obtain applications signed using a particular key from an application repository 140 and compare the applications obtained from application repository 140 to a target application signed using the key. In some cases, the target application may be a known and trusted application.

Analysis engine 132, as discussed above, can generate a similarity (or difference) score for each application obtained from application repository 140 by comparing each application to the target application and calculate an average deviation from the target application. Applications with similarity (or difference) scores within a threshold amount from the average deviation may be assumed to be safe, while applications with similarity (or difference) scores that differ from the calculated average by an amount exceeding the threshold amount may be a potential security risk. When analysis engine 132 determines that an application is a potential security risk, analysis engine 132 may generate an alert to be displayed to a user on an endpoint system 120 (e.g., in management interface 126 on endpoint system $120_1$). The alert may inform a user that an application was detected to be a possible security risk and request that the user indicate whether the application is safe (e.g., should be marked as trusted in reputation service 130) or is unsafe (e.g., should be marked as untrusted in reputation service 130).

In response, analysis engine 132 may receive data from an endpoint system 120 with data indicating whether the application is safe or unsafe. As discussed above, if a user indicates that the application is safe, analysis engine 132 may add the application to a list of applications that may be installed and executed on an endpoint system 120. For example, analysis engine 132 may add a reputation status of "good" or "trusted" to the application in reputation service 130. Otherwise, if a user indicates that the application is unsafe, analysis engine 132 may add the application to a list of applications that are blocked from installing and executing on an endpoint system 120. For example, analysis engine 132 may add a reputation status of "untrusted" to the application in reputation service 130.

Endpoint security interface 134 provides an interface for receiving requests for reputation data from an endpoint monitor 122 at endpoint system 120 and transmitting reputation data to endpoint system 120 for use in allowing or blocking installation and/or execution of applications on endpoint system 120. In some cases, endpoint security interface 134 may further provide an interface for transmitting alerts to an endpoint system 120 used to manage reputation service 130. As discussed above, these alerts may include the identity of an application flagged as a possible security risk and request that a user indicate whether the application is a legitimate application or a rogue application.

Application repository 140 generally may be an existing service that stores and manages applications that can be downloaded onto an endpoint system 120. Applications 124 downloaded from application repository 140 may be updated with new versions of the applications as new versions are added to application repository 140. As discussed above, an analysis engine component of an endpoint monitor 122 on endpoint system 120 or analysis engine 132 in reputation service 130 may obtain all applications available through application repository 140 signed using a particular developer's key and analyze the obtained applications for deviations that may indicate that an application is a potential security risk. After endpoint monitor 122 or analysis engine 132 determines that an application is a potential security risk, and after a user confirms that the application is a security risk, the application may remain available for download from application repository 140. However, users may be blocked from downloading and/or executing the application on endpoint system 120.

Figure 2:
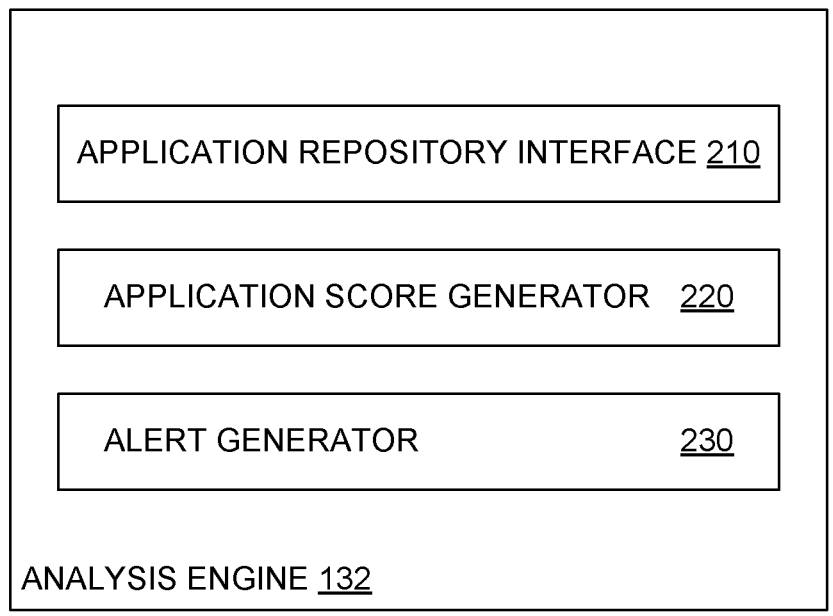
FIG. 2 illustrates an example application analysis engine, according to one embodiment.

FIG. 2 illustrates an example analysis engine 132, according to one embodiment. As illustrated, analysis engine includes an application repository interface 210, application score generator 220, and alert generator 230.

Application repository interface 210 is generally configured to obtain a set of application packages from application repository 140 on a per-key basis. For example, analysis engine 132 may maintain a list of keys used to sign applications available for download from application repository 140. In some cases, a manager of reputation service 130 may select applications associated with a particular key for analysis; in other cases, analysis engine 132 may periodically obtain application packages associated with a particular key for analysis. To obtain application packages from application repository 140, application repository interface 210 may open a connection with application repository 140 and download a copy of each application package signed using the identified key. In some cases, application repository interface 210 may further download additional information about each application package from application repository 140, such as a description of the application.

After application repository interface 210 obtains the set of application packages associated with a particular key, application score generator 220 analyzes each application to calculate a difference (or similarity) score between each application. As discussed above, in one example, application score generator 220 can compare each application in the obtained set to a target application, which may be an application that is known to be legitimate. Application score generator 220 may generate a single difference (or similarity) score for each application relative to the target application. Once application score generator 220 calculates difference (or similarity) scores for each application, application score generator 220 may calculate an average similarity score for the set of applications and provide the calculated similarity scores to alert generator 230 for further analysis.

In another example, application score generator 220 can calculate difference (or similarity) scores for each application package in the set relative to the remaining applications in the set. Application score generator 220 may calculate n−1 difference (or similarity) scores for each application package and may further calculate an average similarity score for each application package based on the n−1 difference (or similarity) scores. Using the average difference (or similarity) score for each application, application score generator 220 can generate an average difference (or similarity) score for the set of applications and provide the calculated average score for each application and the average score for the set of application packages to alert generator 230 for further analysis.

As discussed above, application score generator 220 may generate a difference or similarity score based, at least in part, on application package name, information about components used in each application package, and so on. Because application packages developed by the same developer often use the same (or similar) naming conventions, APIs, GUI elements, and other common attributes, applications developed by the same developer typically would have a low difference score (or correspondingly, a high similarity score). Meanwhile, rogue applications signed using a leaked key may not use the same naming conventions, APIs, GUI elements, and so on as legitimate applications signed using the leaked key, and thus, would have a high difference score (or correspondingly, a low similarity score). Additionally, application score generator 220 may calculate difference and/or similarity scores based, at least in part, on application classification, rules on how applications access and use data (both locally and remotely), and so on.

Alert generator 230 is generally configured to analyze the difference (or similarity) scores generated for each application package in the set of application packages signed using the same key for potential security risks. As discussed above, alert generator 230 may detect a potential security risk based on the difference between a baseline value and a calculated difference (or similarity) score. For example, a baseline value may be set to the average difference (or similarity) score calculated for all of the application packages signed using the key, and a threshold value may represent a permissible amount of variation between application packages signed using the same key. For example, the threshold value may be set to a single standard deviation away from the average difference (or similarity) score calculated for all of the application packages signed using the key.

Using the threshold value and the average difference (or similarity) score, alert generator 230 determines whether the calculated difference (or similarity) score for each application package indicates that an application package is a potential security risk (e.g., a rogue application signed using a rogue key). If the calculated difference (or similarity) score for an application package falls within the acceptable range (e.g., average difference (or similarity) score, plus/minus the threshold value), alert generator 230 need not take any further action for the application package. However, if the calculated difference (or similarity) score for an application falls outside the acceptable range, alert generator 230 may flag the application package as a potentially rogue application and request that a user indicate whether the application package is legitimate or a rogue application.

In some cases, alert generator 230 can further set the reputation status for each application package in reputation service 130 based on detecting potentially rogue applications from deviations in difference (or similarity) scores. For example, when alert generator 230 determines that the difference (or similarity) score for an application package falls within the threshold value from the calculated average, alert generator 230 can set the reputation of the application package to "trusted" or "good." As described above, users may install and execute these applications on an endpoint system 120. If alert generator 230, however, determines that the difference (or similarity) score for an application package diverges from the average by more than the threshold value, alert generator 230 may temporarily set the reputation of the application package to "unknown," which may require that a user explicitly allow the application to execute on endpoint system 120.

When reputation service 132 receives data indicating that an application package flagged as a potential security risk is a legitimate application, reputation service 132 can reset the reputation of the application to "trusted" or "good." However, if reputation service 132 receives data indicating that a flagged application package is a rogue application, reputation service 132 can set the reputation of the application to "untrusted." Endpoint monitor 122 may, as discussed above, use information indicating that an application has a poor reputation to block users of an endpoint system 120 from download, installing, and/or executing the application.

In some cases, when reputation service 132 receives data indicating that an application package flagged as a potential security risk is a rogue application, reputation service 132 may additionally flag the key used to sign the application package as a leaked key. Subsequently, new applications released on an application repository 140 using the leaked key may be presumptively classified as rogue applications (e.g., added to reputation service 132 with a reputation status of "untrusted").

Figure 3:
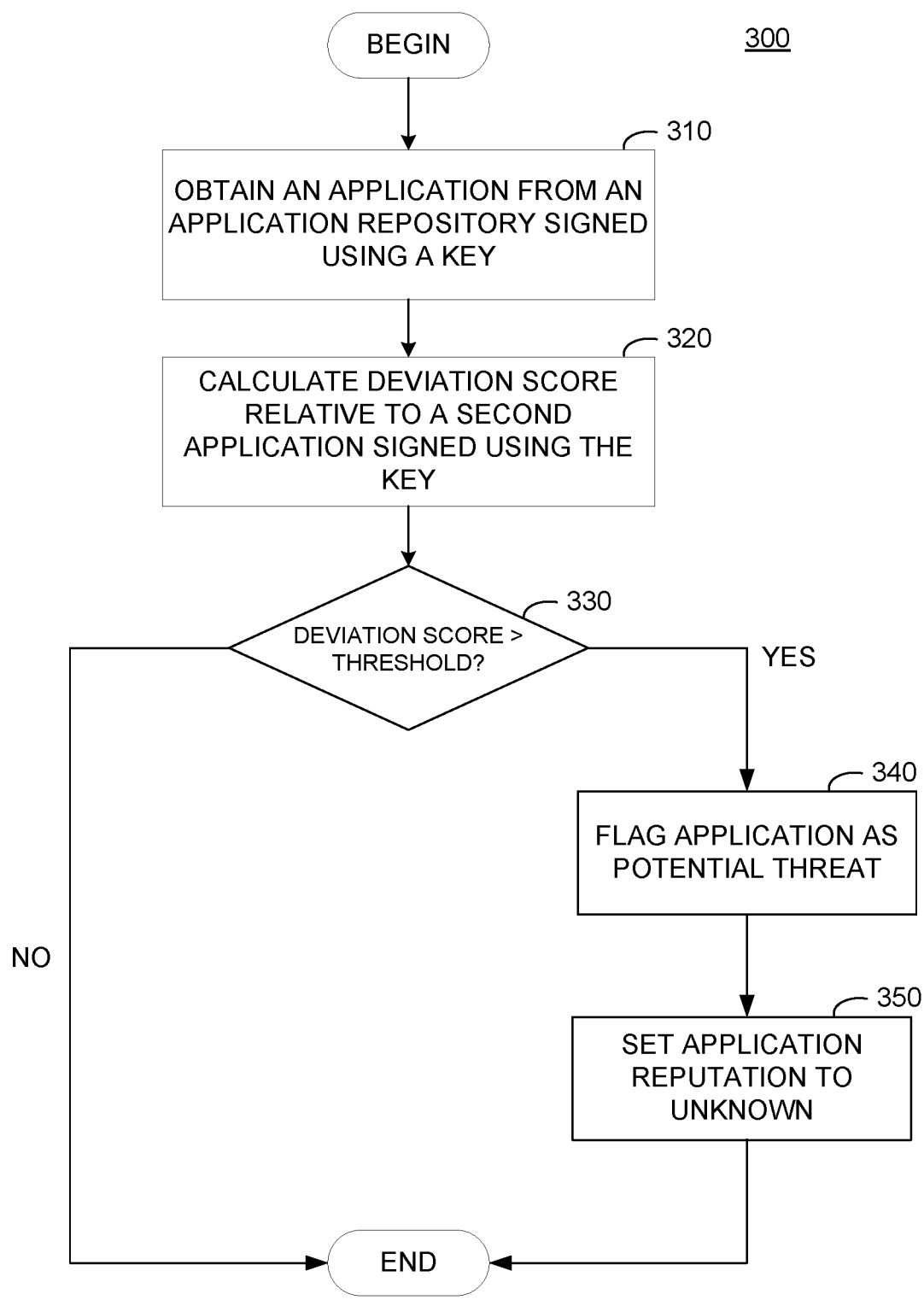
FIG. 3 illustrates example operations for detecting possible rogue applications based on differences between the application and other applications signed using the same key, according to one embodiment.

FIG. 3 illustrates example operations 300 that may be performed by a reputation service to detect potentially rogue applications from a set of application packages signed using a common key, according to one embodiment. Operations 300 begin at step 310, where the reputation service obtains an application from an application repository. As discussed above, the application may be signed using a particular key associated with a single developer, and the application may be one of a set of applications being analyzed for potential security risks (e.g., from rogue applications being signed with the key).

At step 320, the reputation service calculates a deviation score for the application relative to a second application signed using the key. In some cases, as discussed above, the second application may be a known and trusted application. In other cases, the second application may be another application obtained from the application repository.

At step 330, the reputation service determines whether the calculated deviation score exceeds a threshold value. As discussed, above, the reputation service may use an average deviation score calculated across all of the applications from application repository 140 signed using the key as a baseline value. A threshold value may be a number of standard deviations from the baseline value. If the deviation score does not exceed the threshold value (e.g., the deviation score falls between [baseline value−threshold value] and [baseline value+threshold value]), operations 300 may end.

Otherwise, if the deviation score exceeds the threshold value (e.g., the deviation score is less than [baseline value−threshold value] or is greater than [baseline value+threshold value]), at step 340, the reputation service flags the application as a potential security risk. At step 350, the reputation service sets the application reputation to an "unknown" reputation, pending resolution by a manager of the reputation service.

Figure 4:
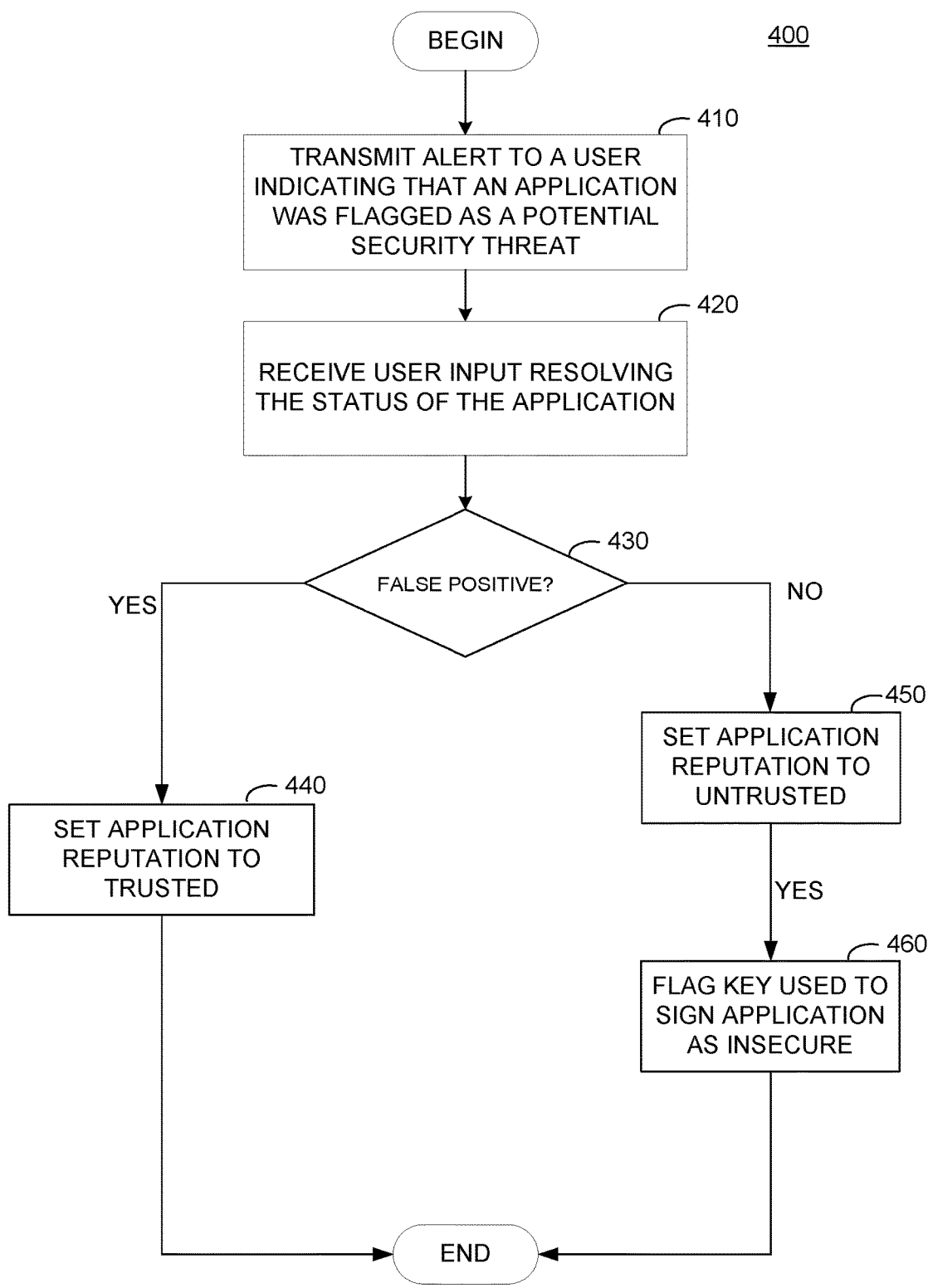
FIG. 4 illustrates example operations for resolving detected possible rogue applications, according to one embodiment.

FIG. 4 illustrates example operations 400 that may be performed to resolve flagged applications as actual security risks or false positives, according to one embodiment. Operations 400 begin at step 410, where the reputation service transmits an alert to a user indicating that an application was flagged as a potential security threat. As discussed above, a reputation service may determine that an application is a potential security threat based on deviations in difference (or similarity) scores relative to a baseline value, which may be an average difference (or similarity) score calculated across a set of application packages signed using the same developer key. An application flagged as a potential security threat may have a difference (or similarity) score deviating from the baseline value by an amount greater than a threshold value (e.g., more than one standard deviation away from the baseline).

In some cases, the reputation service may transmit the alert as a notification to be displayed in management interface 126 on an endpoint system 120 used by a system administrator. Additionally or alternatively, the reputation service may transmit the alert to a system administrator via e-mail or text message. The alert may include, for example, information identifying the application package (e.g., application name, package name, purported developer, and so on) and the key used to sign the application.

At step 420, the reputation service receives user input resolving the status of the application (e.g., whether the application is a legitimate application (e.g., the alert was a false positive) or a rogue application). At step 430, the reputation service determines if the user input indicates that the alert was a false positive. If the alert was a false positive, at step 440, the reputation service sets the application reputation to a trusted status ("good" or "trusted"). As discussed above, by setting the application reputation to a trusted status, users can install and execute the application on an endpoint system 120 without intervention by endpoint monitor 122.

If, however, the user input indicates that the alert was not a false positive (i.e., the flagged application is a security threat), at step 450, the reputation service sets the application reputation to untrusted. As discussed above, by setting the application reputation to untrusted, endpoint monitor 122 may block a user from downloading, installing, and/or executing the application on an endpoint system 120.

At step 460, the reputation service flags the key used to sign the application as insecure. Because a rogue application was signed using the key, the reputation service can infer that the key has been leaked. Thus, future applications signed using the key may not be trustworthy. As discussed above, by flagging the key as a leaked key, the reputation service may presumptively assign an "untrusted" status to new application packages signed using the leaked key. By assigning an "untrusted" reputation status to new applications signed using a leaked key, the reputation system can prevent users from downloading, installing, and/or executing potentially unsafe applications on an endpoint system 120, which may prevent threats such as rogue data exfiltrators, keyloggers, spyware, and so on from compromising user data at endpoint system 120.

Figure 5:
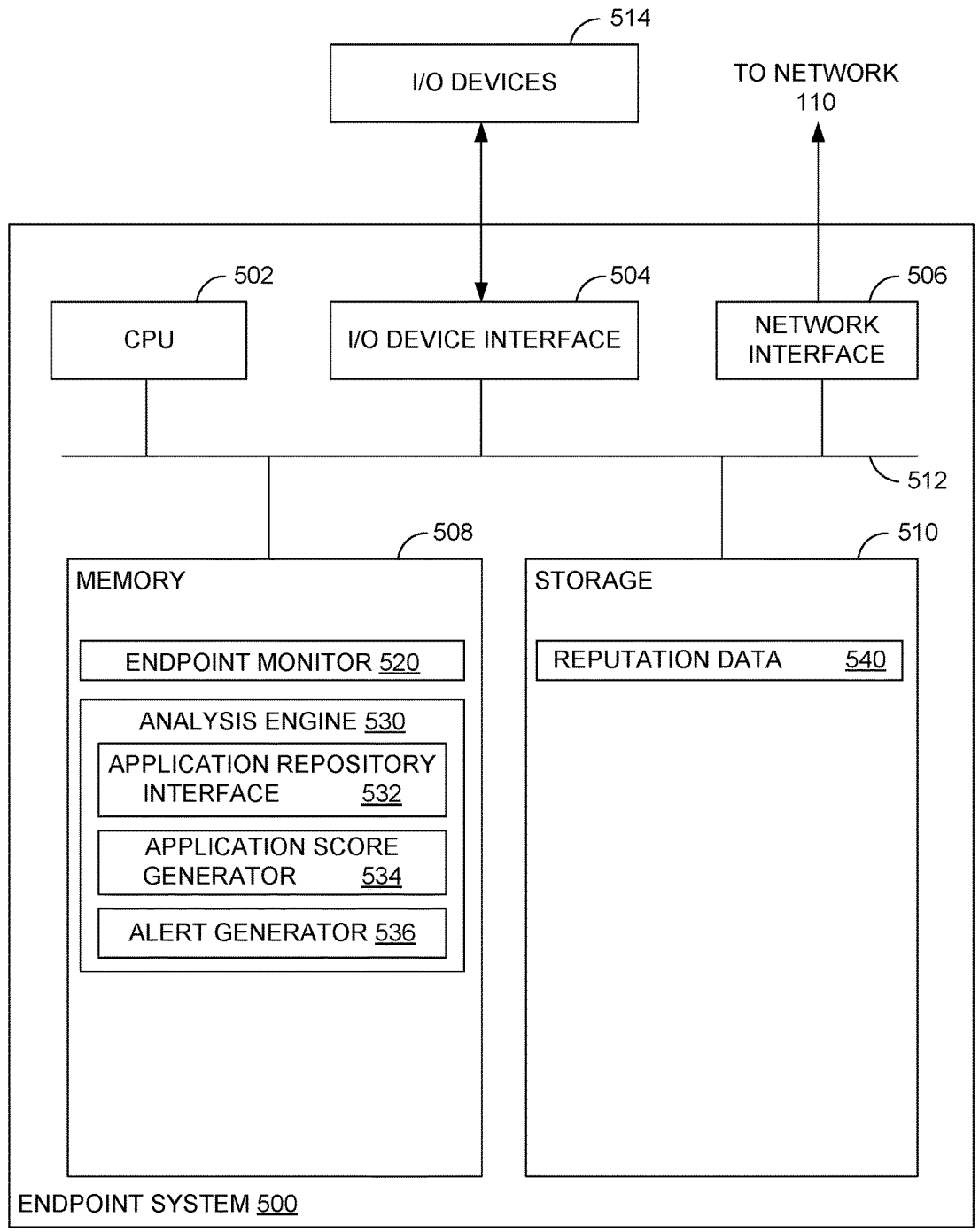
FIG. 5 illustrates an example computing system for managing security ratings of applications based on deviation scores of applications signed using the same key, according to one embodiment.

FIG. 5 illustrates an example endpoint system 500 that uses calculated deviations in difference (or similarity) scores to determine whether application packages signed using a common key are possible security threats, according to an embodiment. As shown, the endpoint system 500 includes, without limitation, a central processing unit (CPU) 502, one or more I/O device interfaces 504 which may allow for the connection of various I/O devices 514 (e.g., keyboards, displays, mouse devices, pen input, etc.) to the endpoint system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes an endpoint monitor 520 and an analysis engine 530. Endpoint monitor 520, as discussed above, may include an interface to obtain reputation data from a reputation data repository. For example, a reputation service interface may transmit a query based on the received data to a remote reputation service via network interface 506 or to a reputation service installed locally on endpoint system 500. In response, endpoint monitor 520 receives data from the reputation service indicating if the application is trusted, untrusted, or neither trusted nor untrusted. Upon receiving information from a reputation service about the reputation of an application, endpoint monitor 520 may allow the application to run on endpoint system 500 without further intervention (e.g., for applications with a "good" or "trusted" reputation), require user permission to execute (e.g., for applications with an "unknown" reputation), or block the application from running on endpoint system 500 (e.g., for applications with a "poor" or "untrusted" reputation).

Analysis engine 530, as discussed above, generally includes an application repository interface 532, an application score generator 534, and an alert generator 536. Application repository interface 532 may obtain a set of application packages from a remote application repository by transmitting a request for all applications signed using a particular key via network interface 506. Upon receiving the set of application packages, application repository interface 532 may provide the set of application packages to application score generator 534 for further analysis.

As discussed above, application score generator 534 generally calculates difference (or similarity) scores between application packages downloaded from a remote application repository via application repository interface 532. In some cases, application score generator 534 calculates difference (or similarity) scores against a reference application package, which may be a known application package that is trusted. In another example, application score generator 534 calculates difference (or similarity) scores for an application package against the other application packages in the set of application packages downloaded from an application repository.

Application score generator 534 may calculate an average difference (or similarity) score for each application and provide the calculated scores to alert generator 536 for further processing. As discussed above, alert generator 536 may calculate a threshold value relative to a baseline difference (or similarity) score, which may be an average difference (or similarity) score calculated by application score generator 534. If a difference (or similarity) score falls within a range between [baseline value−threshold value] and [baseline value+threshold value], alert generator 536 need not take any further action. Otherwise, alert generator 536 may flag the application package as a potential security risk and request that a user indicate whether or not the application is actually a security risk. If the user indicates that the application is a security risk, alert generator 536 may associate the application package with an "untrusted" reputation status and flag the key used to sign the application package as a leaked key. As discussed above, upon flagging the key as a leaked key, future applications signed using the leaked key may be added to a blacklist in reputation data 540, which may block a user of endpoint system 500 from downloading, installing, and/or executing the application on the endpoint system.

As shown, storage 510 includes reputation data 540. As discussed above, reputation data 540 may include data indicating whether applications available on an application repository are trusted, untrusted, or unknown. Endpoint monitor 520 may query reputation data 540 for information about the reputation of a particular application. Further, as discussed above, as analysis engine 530 determines that some applications are potential security risks, the flagged applications may be associated with an "unknown" reputation status in reputation data 540 until a user indicates that the flagged application is legitimate (at which point the reputation data associated with the application is changed to "good" or "trusted") or a rogue application (at which point the reputation data associated with the application is changed to "untrusted"). In some cases, reputation data 540 may further include a database of leaked keys. A key may be added to the database of leaked keys in reputation data 540 when a user indicates that a flagged application signed by a key is, in fact, a rogue application. When a key is added to the list of leaked keys in reputation data 540, a reputation service can monitor an application repository for newly added applications signed using the leaked key and preemptively add these applications to reputation data 540 with an "untrusted" reputation status.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for detecting security risks by a computer security system from application packages signed using an electronic key, the method being performed by a computing device comprising at least one processor, the method comprising:
   calculating, by the at least one processor, individual difference score for a first application package signed using the electronic key based on differences detected between content of the first application package and content of one or more second application packages signed using the electronic key;
   calculating, by the at least one processor, an average difference score from the individual difference scores; and
   upon determining that the individual difference score for a specific application package of the one or more second application packages exceeds the average difference score by a threshold amount:
   setting, by the at least one processor, a reputation associated with the specific application package to an unknown reputation; and
   generating, by the at least one processor, an alert indicating that the specific application package is a potential security risk.

2. The method of claim 1, further comprising:
   upon receiving, in response to the alert, an indication that the specific application package is a legitimate application, setting the reputation associated with the specific application package to a trusted reputation.

3. The method of claim 1, further comprising:
   upon receiving, in response to the alert, an indication that the specific application package is a rogue application, setting the reputation associated with the specific application package to an untrusted application.

4. The method of claim 3, further comprising:
flagging the key used to sign the specific application package as a leaked key.

5. The method of claim 1, wherein the threshold amount comprises a standard deviation away from the average difference score.

6. The method of claim 1, wherein the individual difference scores are calculated based, at least in part, on differences in application program interfaces (APIs) used in the first application package and the one or more second application packages.

7. The method of claim 1, wherein the individual difference scores are calculated based, at least in part, on differences in a package name associated with the first application package and package names associated with the one or more second application package.

8. A non-transitory computer-readable storage medium storing instructions, which, when executed on a processor, perform an operation for detecting security risks from application packages signed using a key, the operations comprising:
calculating individual difference scores for a first application package signed using the key based on differences detected between content of the first application package and content of one or more second application packages signed using the key;
calculating an average difference score from the individual difference scores; and
upon determining that the individual difference score for a specific application package of the one or more second application packages exceeds the average difference score by a threshold amount:
setting a reputation associated with the specific application package to an unknown reputation; and
generating an alert indicating that the specific application package is a potential security risk.

9. The non-transitory computer-readable medium of claim 8, wherein the operations further comprise:
upon receiving, in response to the alert, an indication that the specific application package is a legitimate application, setting the reputation associated with the specific application package to a trusted reputation.

10. The non-transitory computer-readable medium of claim 8, wherein the operations further comprise:
upon receiving, in response to the alert, an indication that the specific application package is a rogue application, setting the reputation associated with the specific application package to an untrusted application.

11. The non-transitory computer-readable medium of claim 10, wherein the operations further comprise:
flagging the key used to sign the specific application package as a leaked key.

12. The non-transitory computer-readable medium of claim 8, wherein the threshold amount comprises a standard deviation away from the average difference score.

13. The non-transitory computer-readable medium of claim 8, wherein the individual difference scores are calculated based, at least in part, on at least one of:
differences in application program interfaces (APIs) used in the first application package and the one or more second application packages; or
differences in a package name associated with the first application package and package names associated with the one or more second application packages.

14. A system comprising:
a processor; and
memory storing code, which, when executed on a processor, perform an operation for detecting security risks from application packages signed using a key, comprising:
calculating individual difference scores for a first application package signed using the key based on differences detected between content of the first application package and content of one or more second application packages signed using the key;
calculating an average difference score from the individual difference scores; and
upon determining that the individual difference score for a specific application package of the one or more second application packages exceeds the average difference score by a threshold amount:
setting a reputation associated with the specific application package to an unknown reputation; and
generating an alert indicating that the specific application package is a potential security risk.

15. The system of claim 14, wherein the operations further comprise:
upon receiving, in response to the alert, an indication that the specific application package is a legitimate application, setting the reputation associated with the specific application package to a trusted reputation.

16. The system of claim 14, wherein the operations further comprise:
upon receiving, in response to the alert, an indication that the specific application package is a rogue application, setting the reputation associated with the specific application package to an untrusted application.

17. The system of claim 16, wherein the operations further comprise:
flagging the key used to sign the specific application package as a leaked key.

18. The system of claim 14, wherein the threshold amount comprises a standard deviation away from the average difference score.

19. The system of claim 14, wherein the individual difference scores are calculated based, at least in part, on differences in application program interfaces (APIs) used in the first application package and the one or more second application packages.

20. The system of claim 14, wherein the individual difference scores are calculated based, at least in part, on differences in a package name associated with the first application package and package names associated with the one or more second application packages.

* * * * *